United States Patent
Hsu et al.

(10) Patent No.: US 7,812,897 B2
(45) Date of Patent: Oct. 12, 2010

(54) METHOD FOR MAKING PRISM SHEET

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/750,899

(22) Filed: Mar. 31, 2010

(65) Prior Publication Data

US 2010/0187704 A1    Jul. 29, 2010

Related U.S. Application Data

(62) Division of application No. 11/965,767, filed on Dec. 28, 2007, now Pat. No. 7,750,989.

(30) Foreign Application Priority Data

Dec. 14, 2007    (CN) .......................... 2007 1 0203066

(51) Int. Cl.
*G02F 1/1335* (2006.01)

(52) U.S. Cl. ............................. 349/57; 349/62; 349/95; 362/620; 362/626; 264/2.5; 264/219; 409/132

(58) Field of Classification Search .................... 349/57, 349/187, 95, 62, 65, 5, 113, 64; 362/620, 362/626, 615, 609; 264/2.5, 219; 409/132
See application file for complete search history.

(56) References Cited

U.S. PATENT DOCUMENTS

| | | | | |
|---|---|---|---|---|
| 6,898,015 B2 * | 5/2005 | Yoshikawa et al. | .......... | 359/619 |
| 7,035,507 B2 * | 4/2006 | Hayashi | ........................ | 385/37 |

* cited by examiner

*Primary Examiner*—Thoi V Duong
(74) *Attorney, Agent, or Firm*—Clifford O. Chi

(57) ABSTRACT

A method for making a prism sheet includes: providing a cutting device comprising a cutter, a table plate, and a control unit, the table plate controlled to move up and down by the control unit, and the cutter having a blade rotatable; providing a mold insert preform on the table plate, the mold insert preform having a flat surface; moving the cutter to etch the flat surface of the mold insert preform along a first direction, and simultaneously driving the table plate to move up and down by the control unit in a first predetermined manner to form first elongated depressions in the flat surface; moving the cutter to etch the flat surface of the mold insert preform along a second direction to form second elongated depressions in the flat surface, thereby forming a mold insert; using the mold insert to form the prism sheet by injection molding method.

4 Claims, 6 Drawing Sheets

METHOD FOR MAKING PRISM SHEET

CROSS-REFERENCE TO RELATED APPLICATIONS

The present application is a divisional application of U.S. patent application Ser. No. 11/965,767, filed on Dec. 28, 2007, now U.S. Pat. No. 7,750,989 which claims foreign priority based on Chinese Patent Application No. 200710203066.0, filed in China on Dec. 14, 2007.

BACKGROUND

1. Technical Field

The present disclosure relates to prisms, and particularly, to a prism sheet used in a liquid crystal display device, and methods for making the prism sheet.

2. Discussion of Related Art

In a liquid crystal display device (LCD device), liquid crystal is a substance that does not itself illuminate light. Instead, the liquid crystal relies on light received from a light source, so that the liquid crystal can display information. In the case of a typical liquid crystal display device, a backlight module powered by electricity supplies the needed light.

FIG. 6 is an exploded, side cross-sectional view of a typical liquid crystal display device 100 employing a typical prism sheet 10. The liquid crystal display device 100 includes a housing 11 and a plurality of lamps 12 positioned in the housing 11. The liquid crystal display device 100 further includes a light diffusion plate 13, a prism sheet 10, and a LCD panel 15 stacked on the housing 11 in that order. The prism sheet 10 includes a base layer 101 and a prism layer 103 formed on the base layer 101. The prism layer 103 has a plurality of prism lenses 105 having a triangular cross section. The prism lenses 105 are arranged regularly, and each extends along a direction parallel to one edge of the prism sheet 10. In use, light emitted from the lamps 12 enters the prism sheet 10 after being scattered in the diffusion plate 13. The light is refracted and concentrated by the prism lenses 105 of the prism sheet 10, and then the light finally exits the prism lenses 105 and propagates into the liquid crystal display panel 15.

Generally, a method of manufacturing the prism sheet 10 includes the following steps: First, a melted ultraviolet-cured transparent resin is coated on the base layer 101, and then the melted ultraviolet-cured transparent resin is solidified to form the prism layer 103. The prism lenses 105 formed this way can be easily damaged or scratched due to their poor rigidity and mechanical strength of the prism layer 103.

In order to protect the prism layer 103 of the prism sheet 10, the liquid crystal display device 100 usually includes an upper light diffusion film 14 disposed on the prism sheet 10. Although the upper light diffusion film 14 and the prism sheet 10 are in contact with each other, a plurality of air pockets still exist at the boundary between the light diffusion film 14 and the prism sheet 10. When the liquid crystal display device 100 is in use, light passes through the air pockets, and some of the light undergoes total reflection at one or another of the corresponding boundaries. In addition, the upper light diffusion film 14 may absorb some of the light from the prism sheet 10. As a result, a brightness of light illumination of the liquid crystal display device 100 is reduced.

Therefore, a new prism sheet and a method for making the prism sheet are desired in order to overcome the above-described shortcomings.

SUMMARY

In one aspect, a prism sheet according to a preferred embodiment includes a transparent main body. The transparent main body has a surface. A plurality of first elongated micro-protrusions and second elongated micro-protrusions protrude from the surface of the main body. Each of the first elongated micro-protrusions extends along a first direction. Widths and heights of each of the first elongated micro-protrusions vary along the first direction. Each of the second elongated micro-protrusions extends along a second direction that intersects with the first direction. Widths and heights of each of the second elongated micro-protrusions vary along the second direction.

In another aspect, a method for making a prism sheet according to a preferred embodiment includes providing a cutting device, the cutting device comprising a cutter, a table plate, and a control unit, the table plate being controlled to move up and down by the control unit, the cutter having a blade that is rotated along its center axis; providing a mold insert preform on the table plate, the mold insert preform having a flat surface; the cutter with the rotating blade being moved to etch the flat surface of the mold insert preform along a first direction, at the same time, the table plate being driven to move up and down by the control unit according to a first predetermined manner, thereby a first elongated depression being formed in the flat surface, wherein widths and sizes of the first elongated depression vary according to the first predetermined manner; repeating the step of forming the first elongated depression to form a plurality of first elongated depressions in the flat surface; the cutter with the rotating blade being moved to etch the flat surface of the mold insert preform along a second direction, at the same time, the table plate being driven to move up and down by the control unit according to a second predetermined manner, thereby a second elongated depression being formed in the flat surface, wherein widths and sizes of the second elongated depression vary according to the second predetermined manner, the second elongated depression intersecting with the first elongated depressions; repeating the step of forming the second elongated depression to form a plurality of second elongated depressions in the flat surface, thereby a mold insert is achieved; using the mold insert to form the prism sheet by injection molding method.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
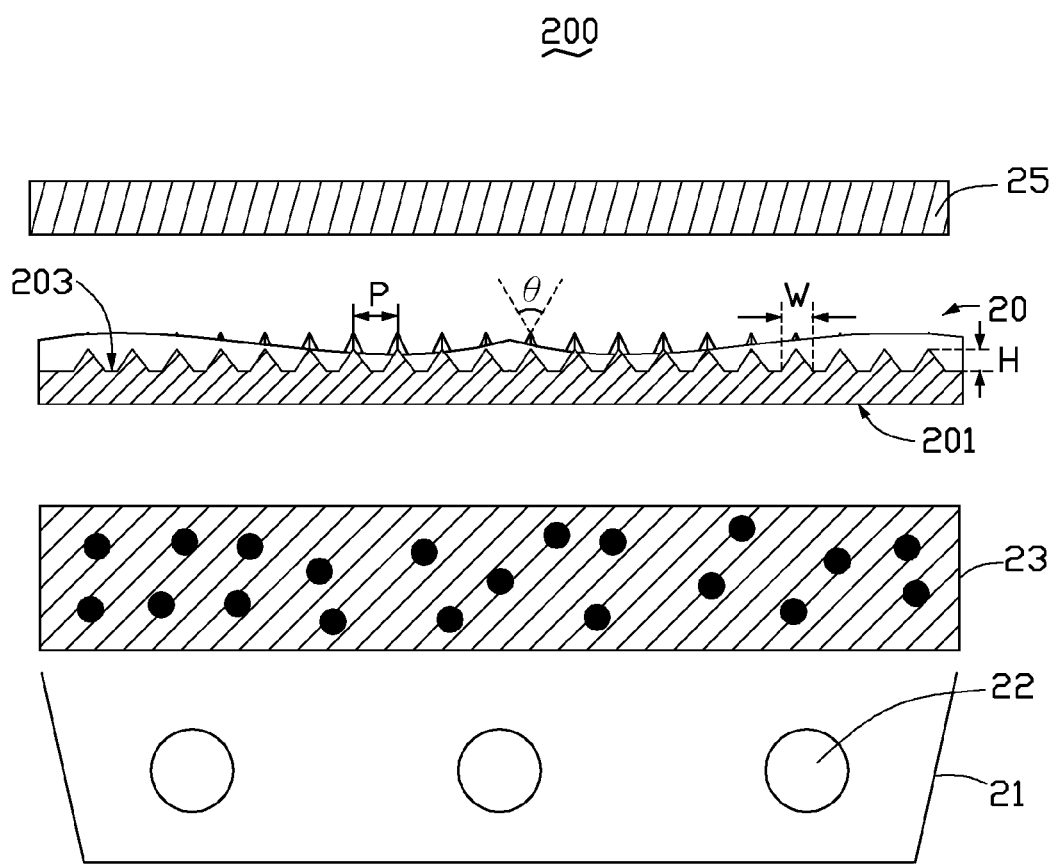
FIG. 1 is a side, cross-sectional view of a liquid crystal display device using a prism sheet according to a first preferred embodiment of the present disclosure.

Referring to FIG. 1, a liquid crystal display device 200 in accordance with a first preferred embodiment of the present disclosure is shown. The liquid crystal display device 200 includes a prism sheet 20, a housing 21, a plurality of lamps 22, a light diffusion plate 23, and a liquid crystal display panel 25. The lamps 22 are regularly aligned above a base of the housing 21. The light diffusion plate 23, the prism sheet 20, and the liquid crystal display panel 25 are stacked on the top of the housing 21 in that order.

Figure 2:
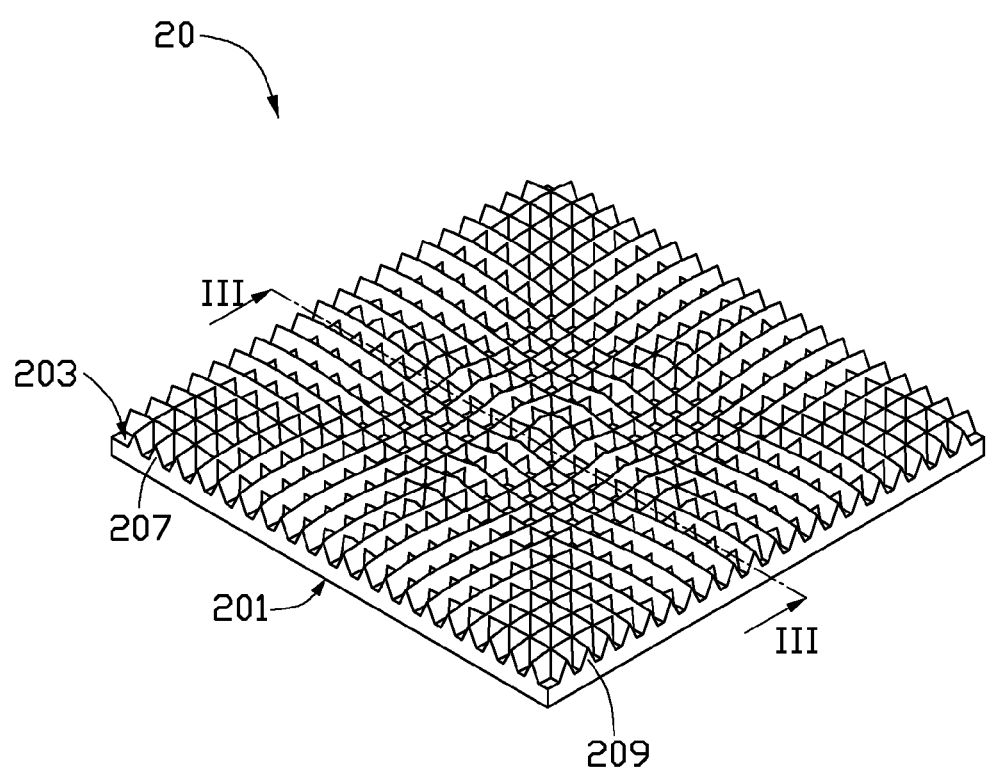
FIG. 2 is an isometric view of the prism sheet of FIG. 1.

Referring to FIG. 2, the prism sheet 20 includes a transparent main body. The transparent main body includes a light input surface 201, a light output surface 203, a plurality of first elongated micro-protrusions 207, and a plurality of second elongated micro-protrusions 209. The light output surface 203 and the light input surface 201 are on opposite sides of the main body. The first elongated micro-protrusions 207 and the second elongated micro-protrusions 209 protrude from the light output surface 203 of the prism sheet 20 respectively. The prism sheet 20 is positioned on the light diffusion plate 23 such that the light input surface 201 is adjacent to the light diffusion plate 23 and the light output surface 203 faces away from the light diffusion plate 23.

Each of the first elongated micro-protrusions 207 extends along a first direction. Widths and heights of each of the first elongated micro-protrusions 207 vary along the first direction in a predetermined pattern. Each of the second elongated micro-protrusions 209 extends along a second direction that intersects with the first direction. Widths and heights of each of the second elongated micro-protrusions 209 vary along the second direction in a predetermined pattern. The first direction and the second direction can be curved or straight. In this embodiment, the first direction and the second direction are both curved. The first elongated micro-protrusions 207 intersect with the second elongated micro-protrusions 209.

The elongated micro-protrusions 207, 209 have V-shaped cross-sections taken along a direction perpendicular to the first direction or the second direction respectively. A vertex angle θ defined by the V-shaped cross-sections of the elongated micro-protrusions 207, 209 is preferably in a range from about 85 degrees to about 95 degrees. A pitch P between adjacent first elongated micro-protrusions 207 along a direction perpendicular to the first direction is configured to be in the range from about 0.025 millimeters to about 1 millimeter. Likewise, a pitch (not labeled) between adjacent second elongated micro-protrusions 209 along a direction perpendicular to the second direction is configured to be in the range from about 0.025 millimeters to about 1 millimeter. Shapes and sizes of the first elongated micro-protrusions 207 are substantially the same. Shapes and sizes of the first elongated micro-protrusions 207 are also substantially the same.

The light input surface 201 is a planar surface. The elongated micro-protrusions 207, 209 of the light output surface 203 are configured for converging light emitted from the light input surface 201. A thickness of the prism sheet 20 is greater than that of a conventional prism sheet. The thickness of the prism sheet 20 is preferably in the range from about 0.4 millimeters to about 4 millimeters. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Referring to FIG. 1 again, the lamps 22 can be point light sources such as light emitting diodes or linear light sources such as cold cathode fluorescent lamps. Even though the housing 21 is configured to be high reflectivity, an extra coating can be further applied on the interior. In this embodiment, the lamps 22 are cold cathode fluorescent lamps. The housing 21 is made of high reflectivity metal.

Compared with the conventional prism sheet, the prism sheet 20 can be easily mass-produced via the injection molding method. Also, because the prism lenses of the conventional prism sheet is formed by solidifying the melted ultraviolet-cured transparent resin, in use, the prism lenses are easily damaged or scratched due to their poor rigidity and mechanical strength. Compared with the conventional prism sheet, the prism sheet 20 of the present disclosure has a better rigidity and mechanical strength. Therefore, the present prism sheet is not easy to be damaged or scratched when in use.

In addition, orientations of the inclined sidewalls of the elongated micro-protrusions 207, 209 could vary in accordance with the various requirements of different viewing angles. In other words, the prism sheet 20 could be orientated according to the different viewing angle requirements. Furthermore, because the arrangement of the elongated micro-protrusions 207, 209 are not aligned with the LCD pixels of the liquid crystal display panel 25, light bands or dark bands produced by diffraction between the prism sheet 20 with the pixel pitch of liquid crystal display panel 25 can be decreased or even eliminated.

Figure 3:
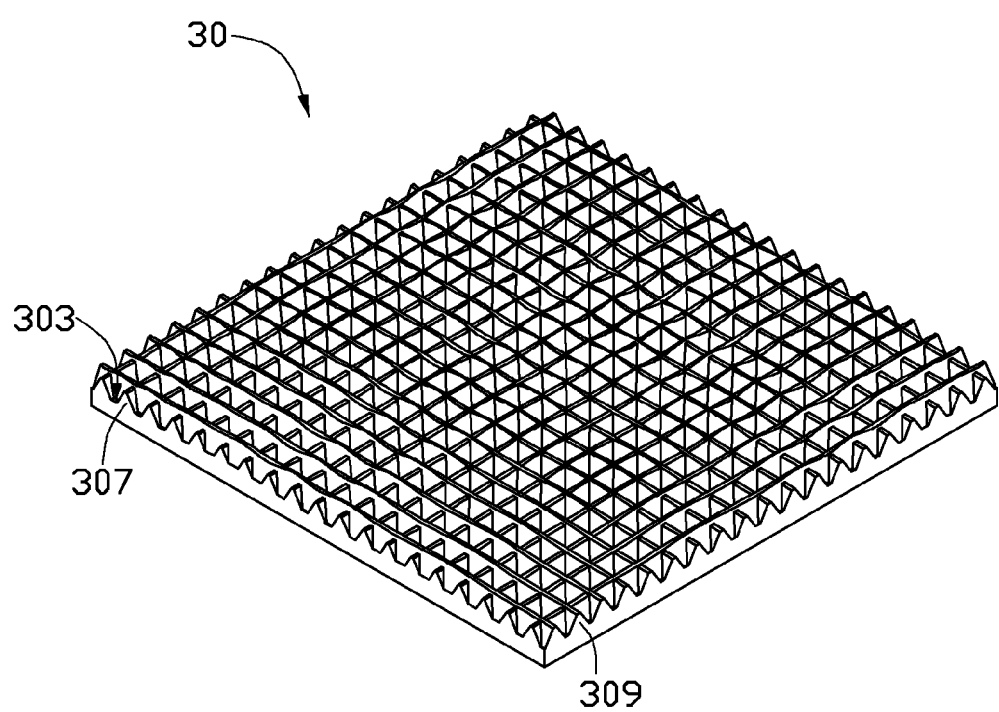
FIG. 3 is an isometric view of a prism sheet according to a second preferred embodiment of the present disclosure.

Referring to FIG. 3, a prism sheet 30 in accordance with a second preferred embodiment of the present disclosure is shown. The prism sheet 30 is similar in principle to the prism sheet 20. However, each of first elongated micro-protrusion 307 extends along a first direction (a straight direction) parallel to one edge of the prism sheet 30. Each of second elongated protrusions 309 extends along a second direction (another straight direction) parallel to another adjoining edge of the prism sheet 30. The first and second elongated micro-protrusions 307, 309 have trapeziform cross-sections taken along a direction perpendicular to the first direction or second direction respectively.

Figure 4:
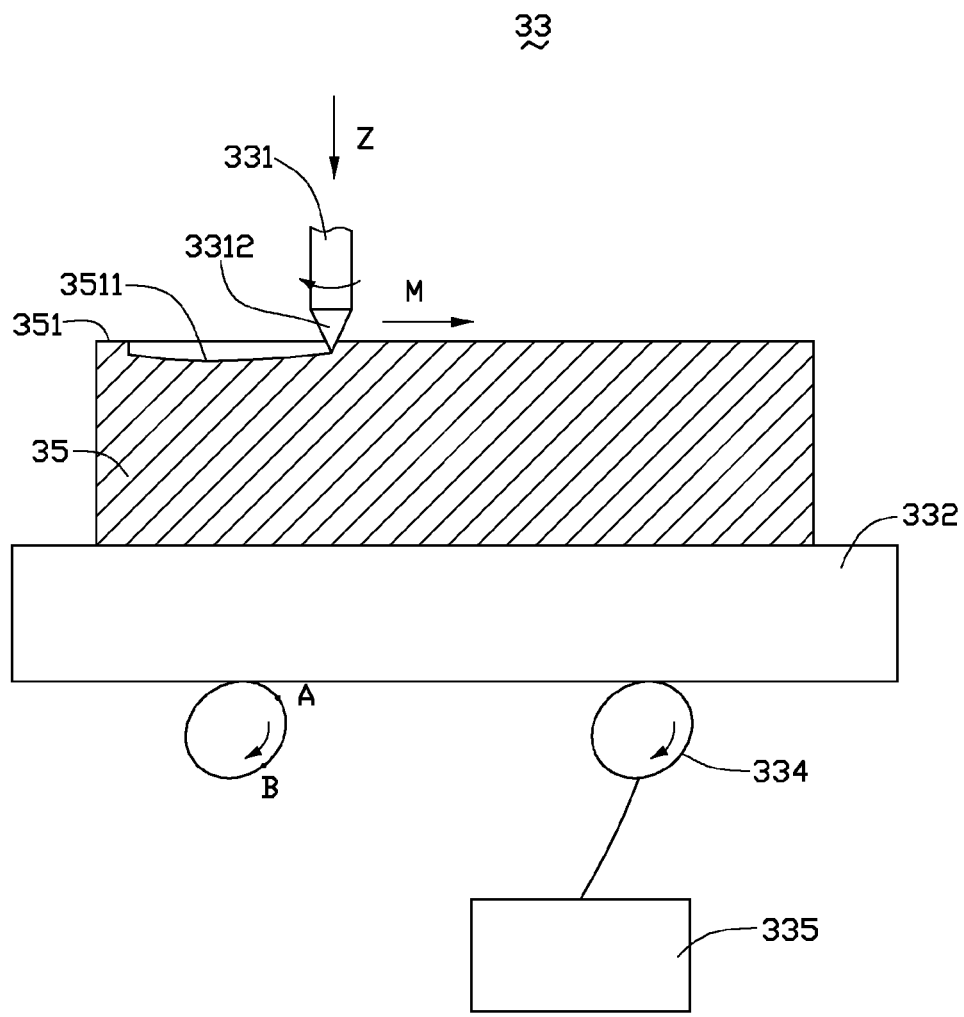
FIG. 4 is a side, cross-sectional view of a cutting device for making a mold insert, the mold insert is used to making a prism sheet of the present disclosure.

Referring to FIG. 4, a cutting device 33 for making a mold insert is depicted. The prism sheet 20 can be made by an injection molding method on the mold insert. The cutting device 33 includes a cutter 331, a table plate 332, a plurality of cams 334, and a control unit 335. The table plate 332 is positioned on the cams 334. The cams 334 are driven to rotate by the control unit 335, thus the table plate 332 moves up and down in a predetermined manner according to the cams 334. The cutter 331 has a conical blade 3312. A vertex angle defined by a cross-section of the conical blade 3312 is configured to be in a range from about 85 degrees to about 95 degrees. The conical blade 3312 of the cutter 331 can be driven to rotate along a Z-axis by the control unit 335. The Z-axis is a center axis of the conical blade 3312 of the cutter 331.

In processing, a mold insert preform 35 is provided on the table plate 332 of the cutting device 33. The cutter 331 with the rotating conical blade 3312 is moved to etch a flat surface 351 of the mold insert preform 35 along a first direction M. At the same time, the table plate 332 of the cutting device 33 is driven to move up and down by the cams 334 according to a first predetermined manner. Therefore, the flat surface 351 of the mold insert preform 35 defines a first elongated depression 351 that extends along the first direction M. Widths and sizes of the first elongated depression 351 vary according to the first predetermined manner. The step of forming the first elongated depression 351 is reused/re-applied to form a plurality of first elongated depressions 351 in the flat surface 351. The cutter 331 with the rotating conical blade 3312 is moved to etch a flat surface 351 of the mold insert preform 35 along a second direction (not shown). At the same time, the table plate 332 of the cutting device 33 is driven to move up and down by the cams 334 according to a second predetermined manner. Therefore, the flat surface 351 of the mold insert preform 35 defines a second elongated depression (not shown) that extends along the second direction. Widths and sizes of the second elongated depression vary according to the second predetermined manner. The step of forming the second elongated depression is reused/re-applied to form a plurality of second elongated depressions in the flat surface 351 that intersect with the first elongated depressions 351. Thus, a mold insert according to the prism sheet 20 is achieved. The prism sheet 20 is manufactured by injection molding by using the mold insert.

Figure 5:
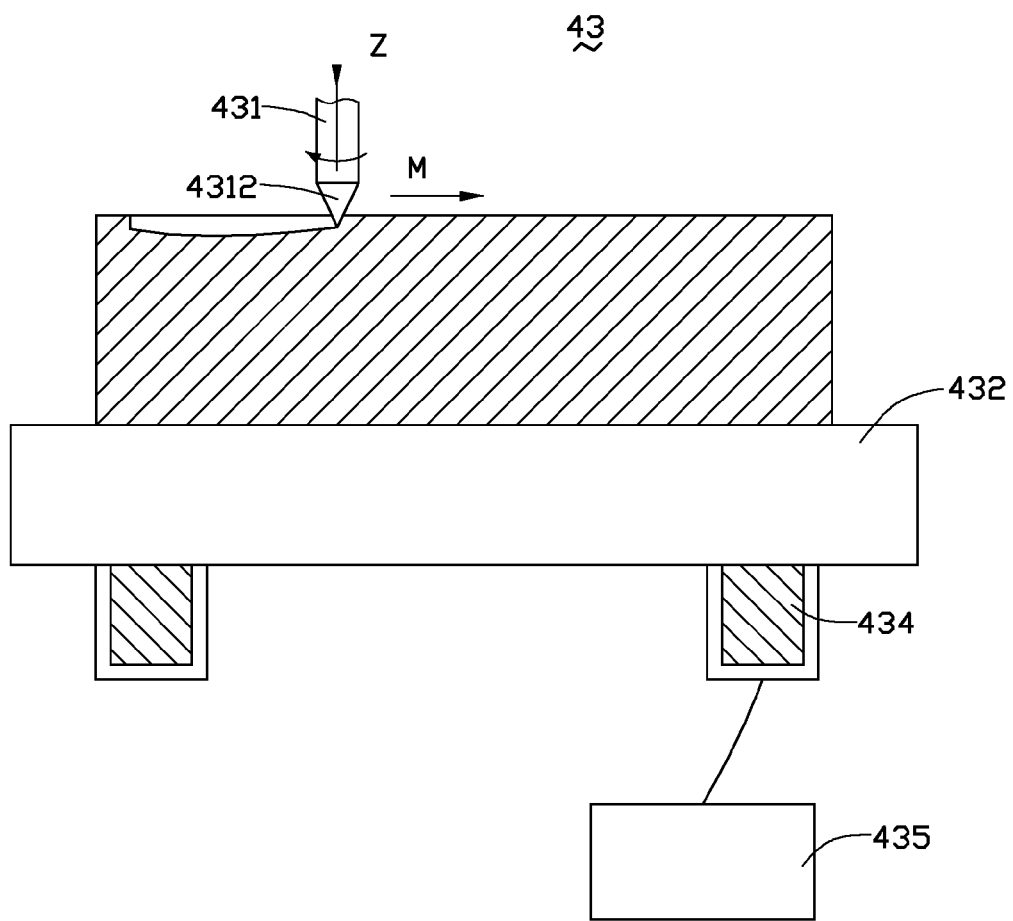
FIG. 5 is a side, cross-sectional view of another cutting device for making a mold insert, the mold insert is used to making a prism sheet of the present disclosure.
Figure 6:
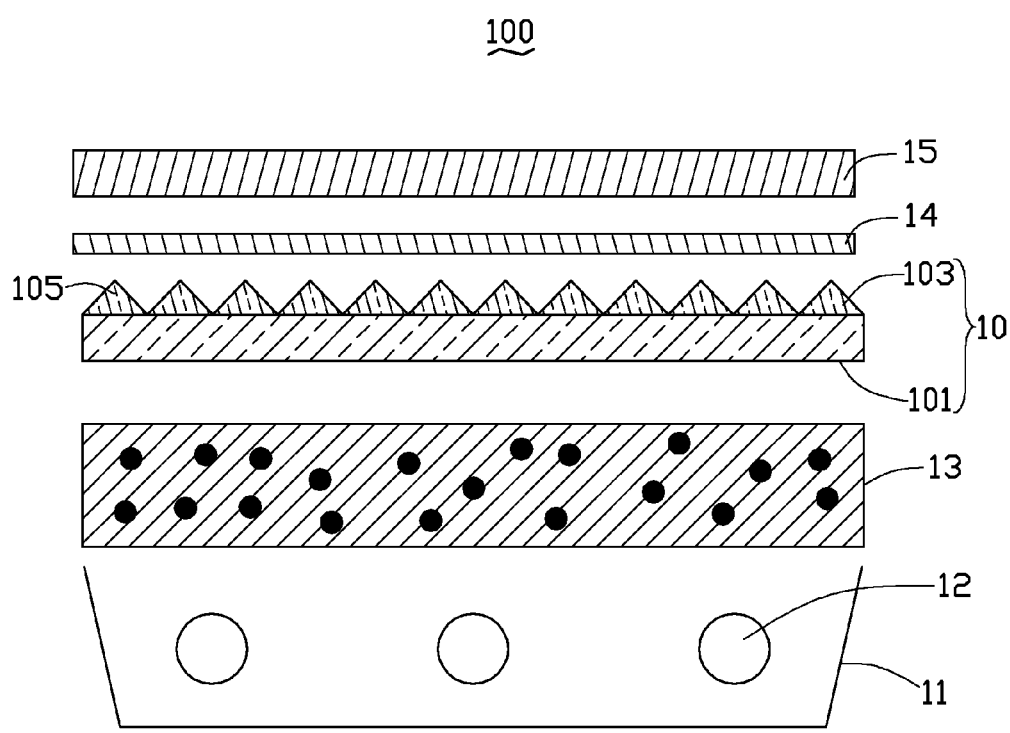
FIG. 6 is a side cross-sectional view of a conventional backlight module employing a typical prism sheet.

Referring to FIG. 5, another cutting device 43 for making a mold insert is provided. The cutting device 43 includes a cutter 431, a table plate 432, a plurality of piezoelectric members 434, and a control unit 435. The table plate 432 is positioned on the piezoelectric members 434. The piezoelectric members 434 are controlled to expanse or shrink by the control unit 435, thus the table plate 432 moves up and down periodically during working. The cutter 431 has a conical blade 4312. A vertex angle of a cross-section of the conical blade 4312 is configured to be a range from about 85 degrees to about 95 degrees. The cutting device 43 is similar in principle as the cutting device 33, except that, the cams 334 of the cutting device 33 are replaced by the piezoelectric members 434.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A method for making a prism sheet, comprising:
   providing a cutting device, the cutting device comprising a cutter, a table plate, and a control unit, wherein the table plate is controlled to move up and down by the control unit, and the cutter has a blade rotatable along its center axis;
   providing a mold insert preform on the table plate, the mold insert preform having a flat surface;
   moving the cutter with the rotating blade to etch the flat surface of the mold insert preform along a first direction, and simultaneously driving the table plate to move up and down by the control unit in a first predetermined manner, thereby forming a first elongated depression in the flat surface, wherein widths and sizes of the first elongated depression vary according to the first predetermined manner;
   repeating the step of forming the first elongated depression to form a plurality of first elongated depressions in the flat surface;
   moving the cutter with the rotating blade to etch the flat surface of the mold insert preform along a second direction, and simultaneously driving the table plate to move up and down by the control unit according to a second predetermined manner, thereby forming a second elongated depression being formed in the flat surface, wherein widths and sizes of the second elongated depression vary according to the second predetermined manner, and the second elongated depression intersect the first elongated depressions;
   repeating the step of forming the second elongated depression to form a plurality of second elongated depressions in the flat surface, thereby forming a mold insert;
   using the mold insert to form the prism sheet by injection molding method.

2. The method for making a prism sheet according to claim 1, wherein the cutting device further comprises a plurality of cams controlled by the control unit, and the table plate is positioned on the cams.

3. The method for making a prism sheet according to claim 1, wherein the cutting device further comprises a plurality of piezoelectric members controlled by the control unit, and the table plate is positioned on the piezoelectric members.

4. The method for making a prism sheet according to claim 1, wherein at least one of the first direction and the second direction is curved or straight.

* * * * *